March 18, 1924.
W. H. BROWN
OPTICAL INSTRUMENT
Filed July 22, 1922
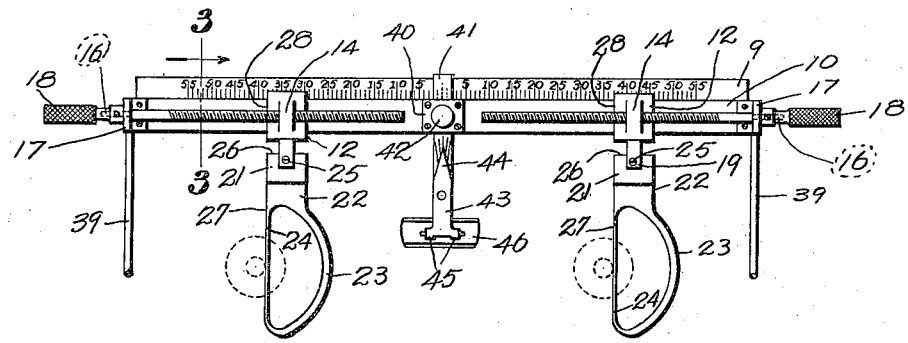
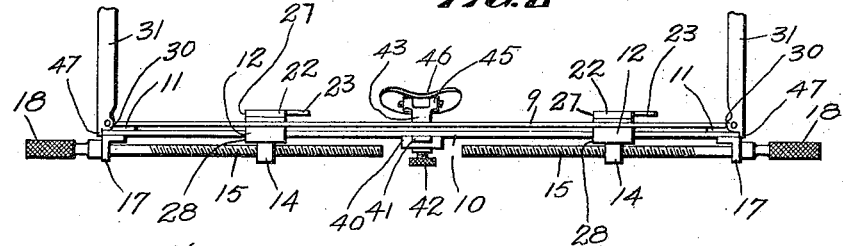
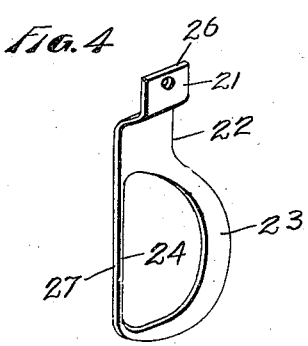
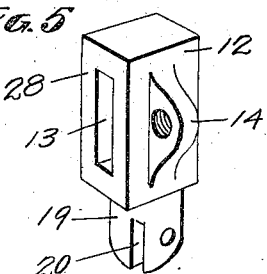
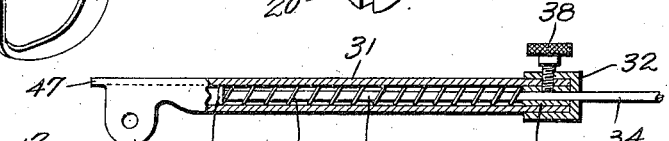
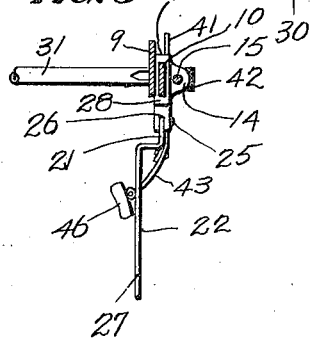
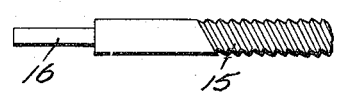
INVENTOR
WILLIAM H. BROWN
BY Edward E. Lingan
ATTY.

Patented Mar. 18, 1924.

1,487,011

UNITED STATES PATENT OFFICE.

WILLIAM H. BROWN, OF ST. LOUIS, MISSOURI.

OPTICAL INSTRUMENT.

Application filed July 22, 1922. Serial No. 576,800.

*To all whom it may concern:*

Be it known that I, WILLIAM H. BROWN, a citizen of the United States, and resident of the city of St. Louis and State of Missouri, have invented certain new and useful Improvements in Optical Instruments, of which the following is a specification containing a full, clear, and exact description, reference being had to the accompanying drawings, forming a part hereof.

My invention relates to improvements in optical instruments, and has for its primary object an optical instrument, whereby the distance of the eyes from each other can be accurately measured.

A further object is to construct an optical instrument, which will indicate whether or not both eyes are equally spaced from the center of the face, and if not, the difference between each eye and the center or medium line of the head. Heretofore, when fitting glasses, it has been the custom of the optician or oculist to use a rule to measure the distance between the pupils or cornea of the eye to determine their distance. This is more or less haphazard, and frequently results in the patient having cross eyes when wearing the glasses, due to the fact that the focus of one lens was not in the proper position, causing the eye to turn in the head in the endeavor to reach this focus.

By the use of my device, the distance of each eye from the center line of the head or face is measured separately, while with the former rule measurement, this distance would only be guessed at.

In the drawings,

Fig. 1 is a front view of my device.

Fig. 2 is a top plan view with portions broken away.

Fig. 3 is a section taken on the line 3—3 of Fig. 1.

Fig. 4 is a perspective view of one of the slide frames made use of.

Fig. 5 is a perspective view of one of the slides made use of.

Fig. 6 is a perspective view of one of the combined hinge and spacing members used.

Fig. 7 is a fragmental longitudinal section of a portion of one of the bows made use of.

Fig. 8 is a fragmental view of one end of the adjusting screws.

In the construction of my device, I employ a plate 9 which has thereon a graduated scale commencing at zero in the center and reading in both directions. This scale is preferably metric, and ruled off in millimeters. Positioned in front of the plate 9 is a slide bar 10. This slide bar is secured to the plate 9 and is held spaced apart therefrom by means of the combined hinge and spacing members 11 which are secured between the plate 9 and slide bar 10, and adjacent the ends thereof. Slidably mounted on the bar 10 are slides 12 which have an opening 13 through which the bar 10 extends. The slides 12 are also provided with screw threaded ears or lugs 14, through which the adjusting screws 15 are inserted. The thread on these adjusting screws is given a coarse pitch so that the slides can be fed forward and backward rapidly. The adjusting screws 15 are provided with reduced ends 16 which pass through brackets 17 secured to the slide bar 10. The ends 16 project through these brackets, and have secured thereon knurled handles which permit the screws to be turned. The slides 12 are also provided with downwardly projecting integral lugs 19 which are slotted as indicated by the numeral 20, and within these slots are secured ears 21 which are formed integral with the slide frames 22. These slide frames have one portion 23 substantially semi-circular in form and a narow vertical strip 24 joining both ends of the semi-circular portion.

The ears 21 as well as the lug or projections 19 are provided with openings through which a screw or other fastening means 25 is inserted for holding the slide frame and the slide securely together. The upper edge 26 of the slide frame rests against the upper edge of the slot 20, so that the slide frame cannot pivot or swing in the lug.

It will be noted that the edge 27 of the slide frame is in direct vertical alinement with the edge 28 of the slot. The purpose of this will be explained later. Secured to the loop 29 of the combined hinge and spacing members 11 are ears 30 which are formed integral with a tube 31. The end of this tube is closed by means of a cap 32 which has the perforation so as to allow the end 33 of the bows 34 to pass therethrough. The end 33 is provided with a knob 35, and between the knob 35 and the sleeve 36 which is located within the tube adjacent the cap is placed a coil spring 37. This coil spring has a tendency to draw the bows back and exert an equal pressure thereon so that the plate 9 can extend straight across the face and not be rocked on the forehead. The bars can be locked in position by means of a thumb screw 38. They can also be turned so that the curved portion 39 of the bows will not become entangled in the hair. Secured to the slide bar 10 and equi-distant from its ends is a slide 40 through which a bar 41 extends. This bar can be held in adjusted position by means of a thumb screw 42. To the lower end of the bar 41 is pivotally attached a bar 43. This bar 43 is provided on one end with a point 44 which registers with a series of lines inscribed on the bar 41, which will indicate whether the bridge of the nose is straight, or to one side or the other. The lower end of the bar 43 is looped as at 45, and to this looped portion is pivotally attached a nose piece or saddle 46. This pivotal attachment allows the nose piece to oscillate so that it can be firmly seated on the nose, regardless of its shape.

It will be noted that the tubes 31 have a projection 47 formed adjacent the ears 30. The purpose of this is to act as a stop for the bows and tube, and prevent them from being spread too far apart.

The operation of my device is as follows:

After the device has been assembled and placed in position on the head of the patient, the screws 15 are manipulated so as to bring the edge 37 of one of the frames at the edge of the pupil or cornea nearest the nose. The other one so operated as to bring the edge 27 at the edge farthest away from the nose of the other pupil or cornea.

My purpose in using the edges of the cornea or pupil is that the distance can be accurately measured, whereas, if it were attempted to measure across the center of the pupil, a certain amount of guess work would result. This gives the proper distance between the pupils of the eyes. This distance is shown on the scale by the edges 28 of the slides which are in alinement as aforementioned, with the edge 27 on the slide frame, as illustrated in Fig. 1.

It will be noted that the one eye is thirty-seven graduate marks from the center, while the other one is thirty-eight. This makes a total of seventy-five, as the distance between the centers of the two eyes, and at the same time indicates that the one eye is one graduation farther from the center of the head than the other. This enables the optician or oculist to properly space the glasses and the focal points thereof so that no twisting or crossing of the eye takes place, nor is there any adjusting of the frame to the face necessary.

Having fully described my invention, what I claim is:

1. An optical instrument comprising a plate, a slide bar secured to said plate and spaced apart therefrom, slides mounted on said bar, means for operating said slides independently and slide frames having a relatively narrow vertical strip secured to said slides.

2. An optical instrument comprising a plate having a graduated scale, a slide bar secured to the front of said plate and spaced apart therefrom, slides mounted on said bar, screws carried by said bar for operating said slides independently of each other and semi-circular slide frames having a narrow vertical strip secured to said slides.

3. The optical instrument of claim 1 in which an adjustable bow is attached adjacent each end of the instrument.

4. The optical instrument of claim 2 in which an adjustable bow is attached adjacent each end of the instrument.

5. An optical instrument comprising a plate, a slide bar secured to said plate and spaced apart therefrom throughout the greater part of its length, slides mounted on said bar, adjusting screws carried by said bar for operating the slides, slide frames secured to said slides, a bar adjustably mounted centrally on said slide bar, and a nose piece pivotally carried by said bar.

6. The optical instrument of claim 5, in which adjustable bars are pivotally secured thereto for holding the same in position on the head.

7. An optical instrument comprising a plate having a graduated scale, a slide bar secured to and in front of said plate and spaced apart therefrom except at the ends, slides mounted on said slide bar, means for operating said slides independently, semi-circular slide frames having a narrow vertical portion integral therewith secured to said slides, a bar adjustably and centrally mounted on said slide bar, a second bar pivotally mounted on said bar, and a saddle pivotally secured to the last mentioned bar.

8. The optical instrument of claim 7, which is equipped with spring actuated adjustable bows for securing the same on the head.

In testimony whereof, I have signed my name to this specification.

WILLIAM H. BROWN.